US012627186B2

(12) United States Patent
Asaoka et al.

(10) Patent No.: US 12,627,186 B2
(45) Date of Patent: May 12, 2026

(54) ROTOR

(71) Applicant: TOYOTA JIDOSHA KABUSHIKI KAISHA, Toyota (JP)

(72) Inventors: Hironori Asaoka, Okazaki (JP); Hideaki Miyazono, Kasugai (JP); Hiroki Kato, Toyota (JP); Fumiaki Yamato, Okazaki (JP); Kiichi Yokoyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 200 days.

(21) Appl. No.: 18/392,045

(22) Filed: Dec. 21, 2023

(65) Prior Publication Data

US 2024/0223034 A1 Jul. 4, 2024

(30) Foreign Application Priority Data

Dec. 28, 2022 (JP) ................................. 2022-211915

(51) Int. Cl.
H02K 1/32 (2006.01)
H02K 7/00 (2006.01)
(52) U.S. Cl.
CPC .............. H02K 1/32 (2013.01); H02K 7/003 (2013.01)
(58) Field of Classification Search
CPC ................................. H02K 1/32; H02K 7/003
See application file for complete search history.

(56) References Cited

U.S. PATENT DOCUMENTS

| | | | | |
|---|---|---|---|---|
| 8,080,908 B2* | 12/2011 | Matsubara | ............... | H02K 1/32 |
| | | | | 310/156.53 |
| 2010/0194220 A1 | 8/2010 | Tatematsu et al. | | |
| 2013/0038151 A1* | 2/2013 | Ohashi | ................... | H02K 7/086 |
| | | | | 310/59 |
| 2016/0149450 A1 | 5/2016 | Horii et al. | | |
| 2020/0036248 A1 | 1/2020 | Krais et al. | | |
| 2021/0391762 A1 | 12/2021 | Chen et al. | | |
| 2023/0299642 A1* | 9/2023 | Kunatharaju | ............ | H02K 1/32 |
| | | | | 310/52 |

FOREIGN PATENT DOCUMENTS

| | | |
|---|---|---|
| EP | 3 934 066 A1 | 1/2022 |
| JP | 9-182375 A | 7/1997 |
| JP | 2012-075244 A | 4/2012 |
| JP | 2012-223075 A | 11/2012 |
| JP | 2021-151098 A | 9/2021 |
| JP | 2022-534643 A | 8/2022 |
| WO | 2015/019402 A1 | 2/2015 |

* cited by examiner

*Primary Examiner* — Terrance L Kenerly
(74) *Attorney, Agent, or Firm* — Sughrue Mion, PLLC

(57) ABSTRACT

The present teachings provide a rotor. The rotor 10 may comprise: a shaft 12; a rotor core 20; a first end plate 50; and a second end plate 52. Rotor core 20 may comprise a first flow path 22a which allows the coolant to flow from the one side to the other side of the axial direction and a second flow path 22d which allows the coolant to flow from the other side to the one. First end plate 50 may comprise a first communication flow path 54a which allows the coolant to flow from shaft 12 to first flow path 22a. Second end plate 52 may comprise a second communication flow path 54d which allows the coolant to flow from shaft 12 to second flow path 22d.

7 Claims, 3 Drawing Sheets

ROTOR

REFERENCE TO RELATED APPLICATION

This application claims priority from Japanese Patent Application No. 2022-211915 filed on Dec. 28, 2022. The entire content of the priority application is incorporated herein by reference.

TECHNICAL FIELD

The art disclosed herein relates to a rotor.

BACKGROUND

A rotor and a stator of a stator to which a coil is fixed together constitute a motor. A rotor core is a cylindrical body holding magnet(s) therein and includes a rotor shaft at its center. Further, the rotor core has end plates respectively fixed to its one side and other side. When the motor operates, the magnet(s) and coil ends extending axially from the stator need to be cooled.

As a conventional art of cooling magnets and coil ends, coolant from a rotor shaft is supplied to a rotor core via an end plate from one side in an axial direction of the rotor core. At the same time as this, the coolant supplied from this end plate is discharged outside to cool the coil ends (Japanese Patent Application Publication No. 2021-151098).

SUMMARY

However, according to such cooling structure with such flow of the coolant, the coolant supplied from the shaft is discharged as it is on the one side of the axial direction of the rotor core. On the other side of the axial direction of the rotor core, the coolant having passed through the rotor core is discharged via the end plate toward the coil end disposed on the other side. That is, the coolant having reached the respective coil ends had resulted in having different temperatures on the one side and on the other side of the axial direction of the rotor core. Due to this, the coil end on the other side could not be sufficiently cooled, and both sides of the axial direction could not be uniformly cooled.

The present teachings provide an art of discharging coolant with a great cooling capability uniformly or at any arbitrary ratio on the one side and the other side of an axial direction of a rotor.

The art disclosed herein is embodied by a rotor. The rotor may comprise: a shaft extending in an axial direction and through which coolant passes; a rotor core fixed to the shaft; a first end plate positioned on one side of the axial direction of the rotor core; and a second end plate positioned on another side of the axial direction of the rotor core. The rotor core may comprise a first flow path which allows the coolant to flow from the one side to the other side of the axial direction and a second flow path which allows the coolant to flow from the other side to the one side of the axial direction. The first end plate may comprise a first communication flow path which allows the coolant to flow from the shaft to the first flow path and a first main discharging flow path which allows the coolant to flow from the shaft to outside. The second end plate may comprise a second communication flow path which allows the coolant to flow from the shaft to the second flow path and a second main discharging flow path which allows the coolant to flow from the shaft to outside.

According to the rotor disclosed herein, the first end plate located on the one side of the axial direction of the rotor allows the coolant from the shaft to flow on the one side of the axial direction along a direction from the one side to the other, and discharges the coolant outside on the one side of the axial direction. Also, the second end plate located on the other side of the axial direction of the rotor core allows the coolant from the shaft to flow on the other side of the axial direction along a direction from the other side to the one, and discharges the coolant outside on the other side of the axial direction.

Due to this, on both the one side and the other side of the axial direction of the rotor core, the coolant which is yet to pass through the flow path in the rotor core, i.e., which has not yet absorbed heat, can be discharged outside. That is, on both the one side and the other side of the axial direction, the coolant with great cooling capability can be discharged outside of the rotor core. As a result of this, when the rotor is implemented in a motor for example, ends of a stator core of the motor on the one side and on the other side in the axial direction of the rotor core, in particular coil ends thereof, can be uniformly and effectively cooled.

Further, the cooling capability of the coolant on the one side and the other side of the axial direction of the rotor core can be easily adjusted by adjusting the supply amount of the coolant for the first or second main discharging flow path. As a result of this, cooling performance for the coil ends on the one side and the other side of the axial direction of the rotor core can be easily adjusted.

DETAILED DESCRIPTION

Embodiments

Figure 1:
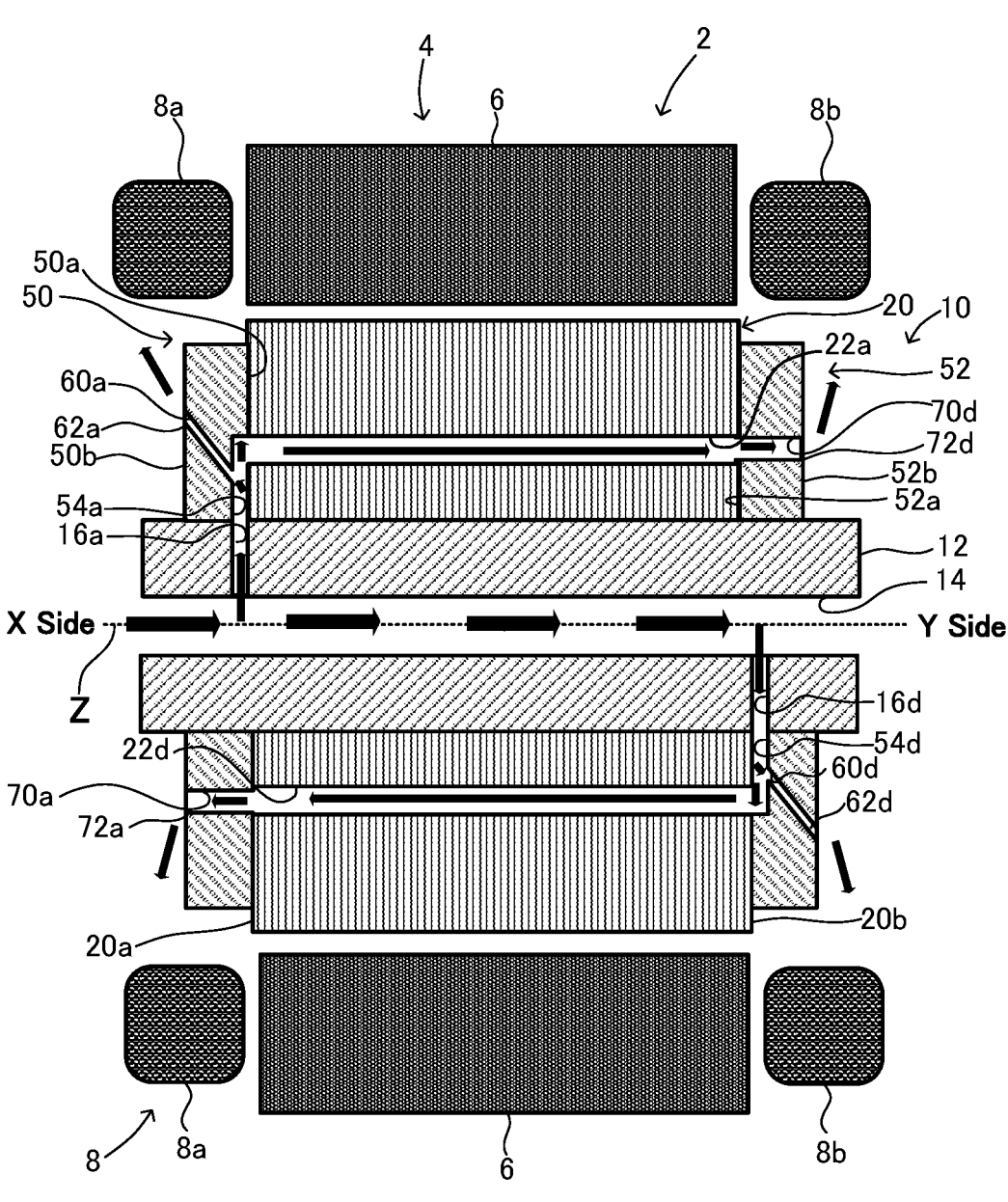
FIG. 1 illustrates an embodiment of a rotor disclosed herein with a stator, showing a cross-sectional view along an axial direction of a rotor core.

A rotor disclosed herein may comprise: a shaft extending in an axial direction and through which coolant passes; a rotor core fixed to the shaft; a first end plate positioned on one side of the axial direction of the rotor core; and a second end plate positioned on another side of the axial direction of the rotor core, wherein the rotor core comprises a first flow path which allows the coolant to flow from the one side to the other side of the axial direction and a second flow path which allows the coolant to flow from the other side to the one side of the axial direction, the first end plate comprises a first communication flow path which allows the coolant to flow from the shaft to the first flow path and a first main discharging flow path which allows the coolant to flow from the shaft to outside, and the second end plate comprises a second communication flow path which allows the coolant to flow from the shaft to the second flow path and a second main discharging flow path which allows the coolant to flow from the shaft to outside.

In an aspect of the present disclosure, the first end plate may comprise the first communication flow path and the first main discharging flow path such that both of the flow paths are branched from each other. The second end plate may comprise the second communication flow path and the second main discharging flow path such that both of the flow paths are branched from each other. According to this, structures of coolant paths in the shaft and coolant paths in the end plates can be simplified.

In this aspect, the first communication flow path may be configured to receive the coolant from the shaft and allow the coolant to flow to the first flow path and the first main discharging flow path may be branched from the first communication flow path. The second communication flow path may be configured to receive the coolant from the shaft and allow the coolant to flow to the second flow path and the second main discharging flow path may be branched from the second communication flow path. According to this, structures of the coolant paths in the shaft and the coolant paths in the end plates can be simplified.

Further in this aspect, the first communication flow path may be configured such that a supply amount of the coolant to the first flow path is greater than the supply amount of the coolant to the first main discharging flow path, and the second communication flow path may be configured such that the supply amount of the coolant to the second flow path is greater than the supply amount of the coolant to the second main discharging flow path. According to this, the rotor core can be sufficiently cooled.

In an aspect of the present disclosure, the first main discharging flow path may be configured to discharge the coolant from the shaft obliquely from the first end plate, toward an outer side in a radial direction of the rotor core and toward the one side of the axial direction. The second main discharging flow path may be configured to discharge the coolant from the shaft obliquely from the second end plate, toward the outer side in the radial direction of the rotor core and toward the other side of the axial direction. This may make it easier for the coolant having passed through the first main discharging flow path and/or the second main discharging flow path to reach coil end(s) of a stator disposed corresponding to the rotor.

In an aspect of the present disclosure, wherein the first end plate may comprise a first auxiliary discharging flow path configured to discharge the coolant delivered through the second flow path. The second end plate may comprise a second auxiliary discharging flow path configured to discharge the coolant delivered through the first flow path. The coolant discharged through the first auxiliary discharging flow path and the second auxiliary discharging flow path can be used to improve or adjust the cooling capability of the coolant on the one side and on the other side in the axial direction.

In an aspect of the present disclosure, the first flow path may comprise a plurality of first flow paths, the second flow path may comprise a plurality of second flow paths, and the rotor core may comprise the plurality of first flow paths and the plurality of second flow paths alternately along a circumferential direction of the rotor core. According to this, the rotor core can be uniformly cooled in the circumferential direction as well.

In an aspect of the present disclosure, the first end plate and the second end plate may have a same shape and may be both fixed on the rotor core such that the first end plate and the second end plate are offset from each other by a predetermined angle about a rotary axis of the shaft. According to this, the number of components can be reduced and the fabrication of the end plates can be simplified, while a superior cooling performance can be exhibited on the one side and on the other side of the axial direction of the rotor core.

As an aspect of the present teachings, a motor comprising a rotor according to any of the aforementioned embodiments and a stator is also provided.

Hereinafter, embodiments of a rotor disclosed herein will be described with reference to drawings. In the present teachings, when simply mentioning "radial direction/radially", it means a radial direction of a rotor core. When simply mentioning "circumferential direction/circumferentially", it means a circumferential direction of the rotor core. When simply mentioning "axial direction/axially", it means an axial direction of the rotor core.

Figures 2A, 2B:
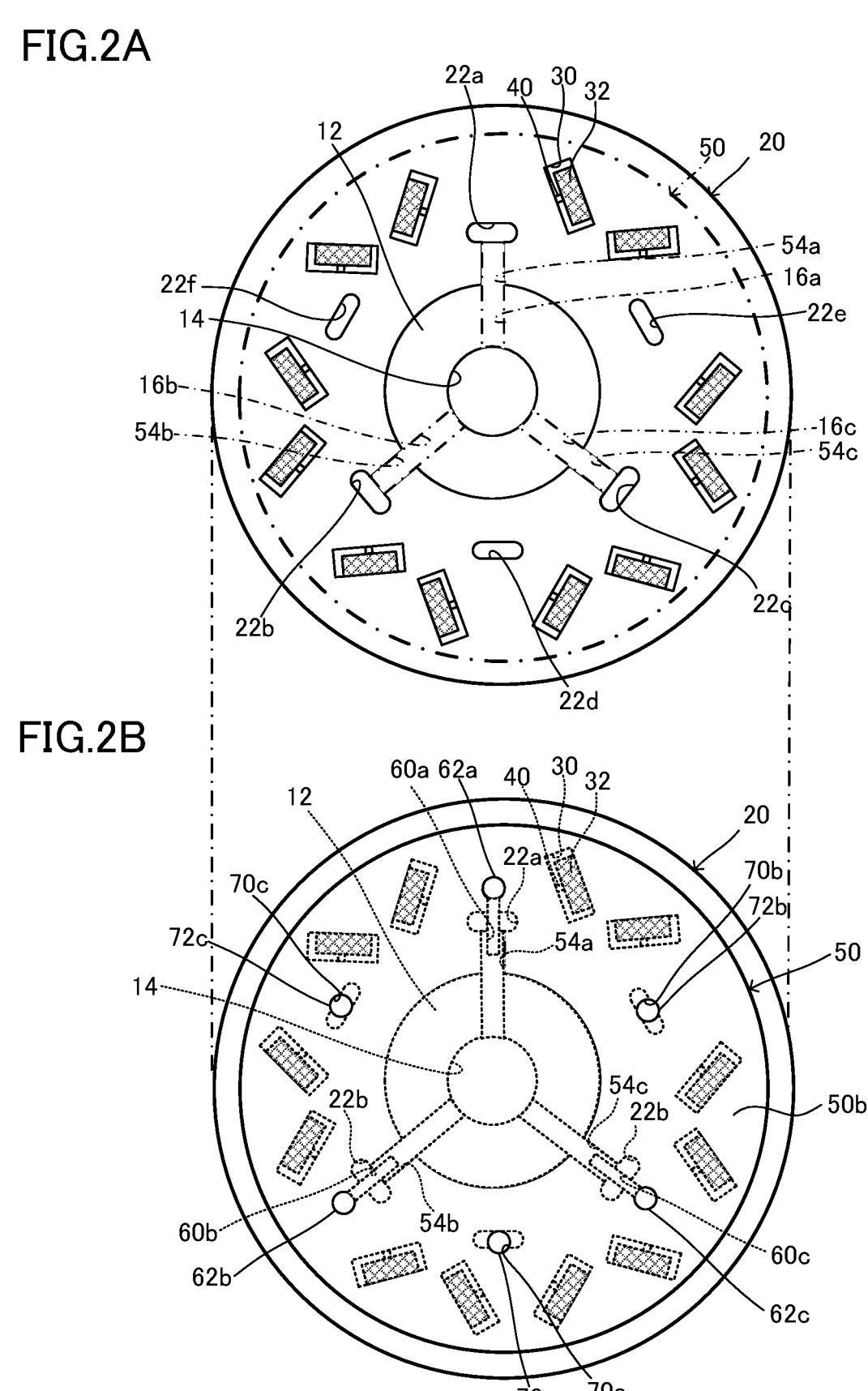
FIG. 2A illustrates a plan view seen from an X side of the rotor core illustrated in FIG. 1.
FIG. 2B a plan view seen from the X side of an end plate fixed on the X side of the rotor core illustrated in FIG. 1.
Figures 3A, 3B:
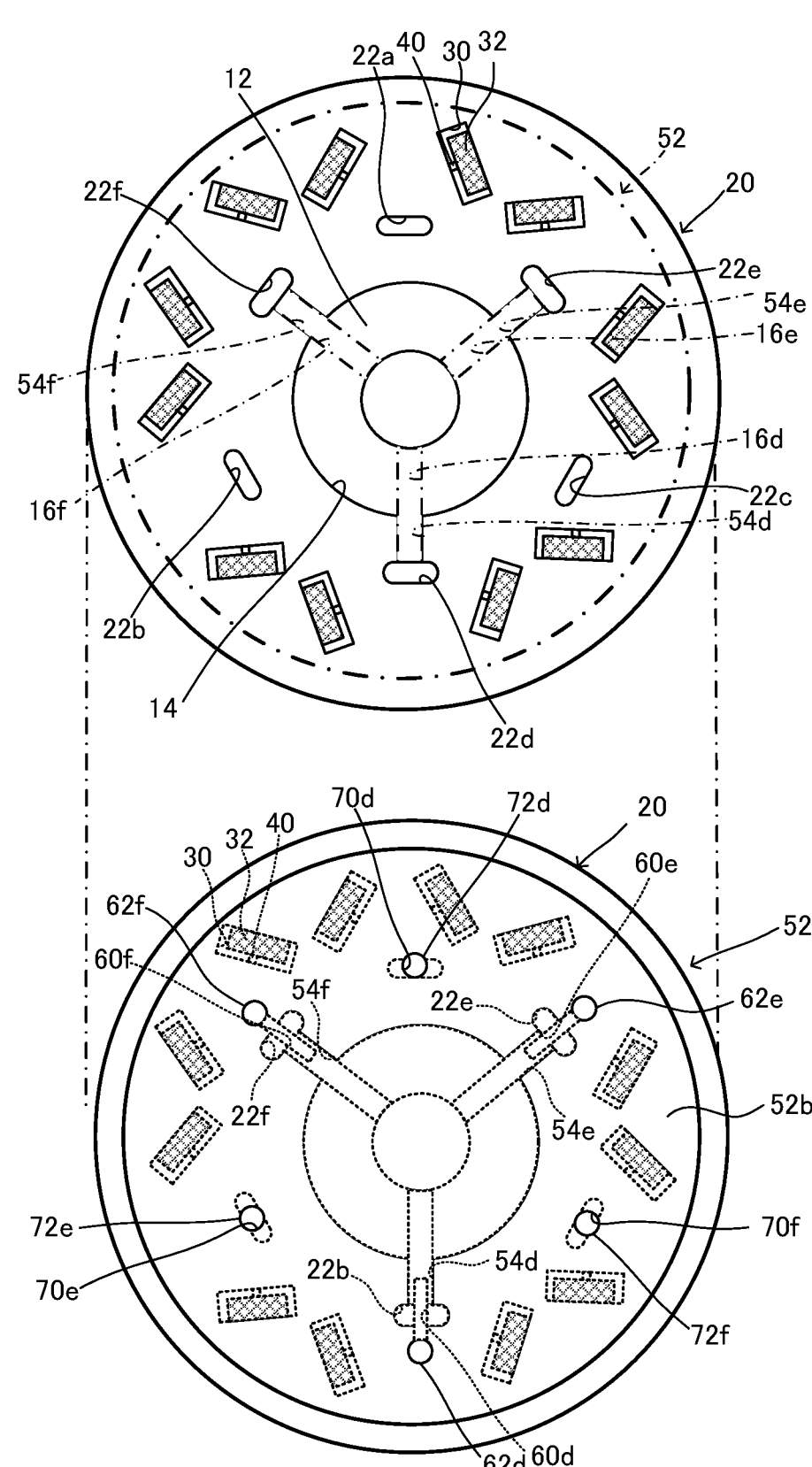
FIG. 3A illustrates a plan view seen from a Y side of the rotor core illustrated in FIG.
FIG. 3B illustrates a plan view seen from the Y side of an end plate fixed to the Y side of the rotor core illustrated in FIG. 1

FIG. 1 illustrates a cross section taken along an axial direction of a rotor 10 according to the present embodiment with a stator 4 which constitutes a motor 2 with this rotor 10. In FIG. 1, a cross section in which coolant flow paths 22*a*, 22*d* are seen concurrently is shown. FIG. 2A and FIG. 2B illustrate a combination of a plan view seen from one side of an axial direction of a rotor core 20 which constitutes the rotor 10 shown in FIG. 1 (this one side will be denoted "X side" in FIG. 1; and hereinafter referred simply as "X side") and a plan view of an end plate 50 fixed to the X side of the rotor core 20 as seen from the X side. FIG. 3A and FIG. 3B illustrate a combination of a plan view seen from another side of the axial direction of the rotor core 20 constituting the rotor shown in FIG. 1 (this other side will be denoted "Y side" in FIG. 1; and hereinafter referred simply as "Y side") and a plan view of an end plate 52 fixed to the Y side as seen from the Y side.

The motor 2 indicated herein may encompass various known types of motors. The motor 2 may not be particularly limited, but for example, may be a motor generator configured to function as electric motor or generator. For example, the motor 2 may constitute a traction power source for a vehicle by itself or with an engine.

As shown in FIG. 1, the motor 2 comprises the stator 4 and the rotor 10. The stator 4 includes the stator core 6 and the coil 8. The stator core 6 has a cylindrical shape extending in the axial direction. The stator core 6 is arranged on an outer circumference of the rotor core 20 with a predetermined interval from the rotor core 20. The coil 8 is constituted of wiring with a insulation coating and wound on the stator core 6. The coil 8 comprises coil ends 8*a*, 8*b* protruding respectively from end surfaces of the stator core 6 on the X and Y sides.

The rotor 10 comprises a shaft 12, the rotor core 20, and the end plates 50, 52. The shaft 12 is rotatably supported about a rotary axis Z by bearings mounted on a housing (not illustrated) of the motor 2.

As shown in FIG. 1, the shaft 12 has incorporated therein a coolant flow path 14 where the coolant can flow along its axial direction. The coolant is not particularly limited, and for example a suitable oil may be used.

As shown in FIG. 1 and FIG. 2A, the shaft 12 comprises coolant supply paths (hereafter, simply termed "supply paths") 16*a*, 16*b*, 16*c* at a fixation position where the end plate 50 is fixed on the X side. The supply paths 16*a*, 16*b*, 16*c* each extend from the coolant flow path 14 toward the end plate 50 by penetrating through an outer circumference part of the shaft 12 in a radially outward direction. The supply paths 16*a*, 16*b*, 16*c* are defined at predetermined intervals along a circumferential direction of the shaft 12.

As shown in FIG. 1 and FIG. 3A, the shaft 12 further comprises supply paths 16*d*, 16*e*, 16*f* at a fixation position where the end plate 52 is fixed on the Y side, similar to the X side. The supply paths 16d, 16e, 16f are defined at predetermined intervals along the circumferential direction of the shaft 12, but are offset from the supply paths 16a, 16b, 16c about the rotary axis Z, so that all the supply paths 16a to 16f are arranged at equal intervals about the rotary axis Z of the shaft 12.

The rotor core 20 is constituted of laminated steel plates having magnetic steel plates constituted of magnetic substance such as iron or iron alloy stacked on one another in the axial direction. The rotor core 20 is fixed to the shaft 12 through a center hole penetrating through the rotor core 20 in the axial direction.

As shown in FIG. 2A and FIG. 3A, the rotor core 20 comprises coolant flow paths (hereafter, simply termed "flow paths") 22a, 22b, 22c, 22d, 22e, 22f through which the coolant flows from the center hole, arranged at equal intervals along the circumferential direction at predetermined positions on a radially-outer side.

The rotor core 20 further comprises plural magnet slots 30 penetrating therethrough in the axial direction and plural magnets 32 along the circumferential direction more on the radially-outer side than the flow paths 22a to 22f. Each of the magnet slots 30 houses one of the magnets (permanent magnets) 32.

A shape of the magnets 32 is not particularly limited, and for example may be a columnar body having an elongated cross-sectional shape and extending in the axial direction of the rotor core 20. Also, each slot 30 is defined as a hole having an opening for housing the magnet 32 and extending in the axial direction. Each slot 30 may be a hole comprising an opening having a substantially elongated shape where the magnet 32 with an elongated cross-sectional shape can be housed.

A layout pattern of the magnet slots 30 in the rotor core 20 is not particularly limited, and for example two magnets 32 are arranged along the circumferential direction of the rotor core 20 so as to form a pole as a pair. The pair of magnets 32 is arranged in a substantially V shape by being angled toward the shaft 12 and symmetrically to each other so that ends of the magnets 32 facing each other are closer on a radially-inner side. Although this is not limiting in particular, six to eight poles may be formed in the rotor core 20, for example.

For example, each magnet 32 with the elongated cross-sectional shape is fixed by a surface of a long side (hereafter, long-side surface) on the radially-outer side thereof being compressed against an internal surface of the rotor core 20 defining an internal surface on the radially-outer side of the magnet slot 30 (hereafter, this internal surface will be referred to as the internal surface on the radially-outer side of the magnet slot 30). Each magnet slot 30 comprises a pawl section 40 for fixing the magnet 32, as shown in FIG. 2A and FIG. 3A. The pawl section 40 extends from the internal surface on the radially-inner side of the magnet slot 30 toward the long-side surface of the magnet 32 to compress and fix the magnet 32 radially outward to the rotor core 20. A suitable number of the pawl sections 40 may be arranged in intervals each defined along the axial direction between the magnet 32 and the internal surface of the magnet slot 30.

As shown in FIG. 1, the rotor core 20 has end surfaces 20a, 20b on the X and Y sides to which the end plates 50, 52 are fixed respectively. The end plates 50, 52 are disc-shaped plates and sandwich the rotor core 20. The end plates 50, 52 are an example of a first end plate and a second end plate disclosed herein.

As shown in FIG. 1, FIG. 2A and FIG. 2B, the end plate 50 comprises communication flow paths 54a, 54b, 54c that connect the supply paths 16a, 16b, 16c arranged on the X side of the shaft 12 and the flow paths 22a, 22b, 22c in the rotor core 20 with each other. The communication flow paths 54a, 54b, 54c are arranged as grooves extending radially outward in an end surface 50a of the end plate 50 which faces the end surface 20a of the rotor core 20. The communication flow paths 54a, 54b, 54c allow the coolant supplied from the supply paths 16a, 16b, 16c to be delivered to the flow paths 22a, 22b, 22c. The coolant flows further toward the Y side. Due to this, the flow paths 22a, 22b, 22c are configured to allow the coolant from the X side to the Y side inside the rotor core 20. The flow paths 22a, 22b, 22c are examples of the first flow path disclosed herein, and the communication flow paths 54a to 54c are examples of a first communication flow path disclosed herein.

As shown in FIG. 1, FIG. 2A and FIG. 2B, the communication flow paths 54a, 54b, 54c respectively comprise discharging flow paths 60a, 60b, 60c. The discharging flow paths 60a, 60b, 60c each branches from the communication flow path 54a, 54b, 54c at a predetermined position that is on the inner inside of the flow path 22a, 22b, 22c in the radial direction. The discharging flow paths 60a, 60b, 60c are configured to discharge the coolant supplied through the communication flow paths 54a, 54b, 54c outside the end plate 50. The discharging flow paths 60a, 60b, 60c are each in a form of a flow path extending in the end plate 50 radially outward as well as toward the X side at an angle from their branching point(s). The discharging flow paths 60a, 60b, 60c comprise discharge ports 62a, 62b, 62c on the X-side end surface 50b of the end plate 50. The discharging flow paths 60a, 60b, 60c are examples of a first main discharging flow path in the present teachings.

Each of the branching parts to the discharging flow paths 60a, 60b, 60c is respectively configured such that a supply amount of the coolant flowing to its corresponding coolant flow path 22a, 22b, 22c is greater than a supply amount of the coolant flowing to its corresponding one of the discharging flow paths 60a, 60b, 60c.

As shown in FIG. 1, FIG. 3A and FIG. 3B, the end plate 52 comprises communication flow paths 54d, 54e, 54f that connect the supply paths 16d, 16e, 16f arranged on the Y side of the shaft 12 and the flow paths 22d, 22e, 22f in the rotor core 20 with each other. The communication flow paths 54d, 54e, 54f are arranged as grooves extending radially outward in an end surface 52a of the end plate 52 which faces the end surface 20b of the rotor core 20 and the communication flow paths 54d, 54e, 54f allow the coolant supplied from the supply paths 16d, 16e, 16f to be delivered to the flow paths 22d, 22e, 22f. The coolant flows further toward the Y side. Due to this, the flow paths 22d, 22e, 22f are configured to allow the coolant to flow from the X side to the Y side inside the rotor core 20. The flow paths 22d, 22e, 22f are examples of the second flow path disclosed herein, and the communication flow paths 54d, 54e, 54f are examples of a second communication flow path disclosed herein.

As shown in FIG. 1, FIG. 3A and FIG. 3B, the communication flow paths 54d, 54e, 54f comprise discharging flow paths 60d, 60e, 60f. The discharging flow paths 60d, 60e, 60f each branches from the communication flow path 54d, 54e, 54f at a predetermined position that is on the inner side of the flow path 22d, 22e, 22f in the radial direction. The discharging flow paths 60d, 60e, 60f are configured to discharge the coolant supplied through the communication flow paths 54d, 54e, 54f outside the end plate 52. The discharging flow paths

60*d*, 60*e*, 60*f* are each in a form of a flow path extending in the end plate 52 radially outward as well as toward the Y side at an angle from their branching point(s). The discharging flow paths 60*d*, 60*e*, 60*f* comprise discharge ports 62*d*, 62*e*, 62*f* on the Y-side end surface 52*b* of the end plate 52. Each of the branching parts to the discharging flow paths 60*d*, 60*e*, 60*f* is respectively configured such that a supply amount of the coolant flowing to the coolant flow path 22*d*, 22*e*, 22*f* is greater than a supply amount of the coolant flowing to the discharging flow path 60*d*, 60*e*, 60*f*. The discharging flow paths 60*d*, 60*e*, 60*f* are examples of a second main discharging flow path in the present teachings.

Further, as shown in FIG. 1 and FIG. 2B, the end plate 50 comprises discharging flow paths 70*a*, 70*b*, 70*c*. The discharging flow paths 70*a*, 70*b*, 70*c* are configured to discharge the coolant delivered through the flow path 22*d*, etc. from the Y side of the rotor core 20 to outside the rotor core 20. These discharging flow paths 70*a*, 70*b*, 70*c* have discharge ports 72*a*, 72*b*, 72*c* that overlap openings of the flow paths 22*d*, 22*e*, 22*f* in the axial direction, penetrate through the end plate 50 in the axial direction, and are configured to discharge the coolant from the end surface 50*b*.

Similarly, as shown in FIG. 1 and FIG. 3B, the end plate 52 comprises discharging flow paths 70*d*, 70*e*, 70*f*. The discharging flow paths 70*d*, 70*e*, 70*f* are configured to discharge the coolant delivered through the flow path 22*a*, etc. from the X side of the rotor core 20 to outside the rotor core 20. These discharging flow paths 70*d*, 70*e*, 70*f* have discharge ports 72*d*, 72*e*, 72*f* that overlap openings of the flow paths 22*a*, 22*b*, 22*c* in the axial direction, penetrate through the end plate 52 in the axial direction, and are configured to discharge the coolant from the end surface 52*b*.

Next, a flowing configuration of the coolant in the rotor 10 configured as such will be described with reference to FIG. 1 and FIGS. 2 to 3.

Arrows in FIG. 1 indicate flowing directions of the coolant. As shown in FIG. 1, the coolant supplied from an oil source (not illustrated) flows from the flow path 14 of the shaft 12 into the X-side supply paths 16*a*, 16*b*, 16*c*. The coolant flows through the communication flow paths 54*a*, 54*b*, 54*c* of the end plate 50 and then in the flow paths 22*a*, 22*b*, 22*c* toward the Y side. The coolant has not yet absorbed heat as it was supplied from the shaft 12, and thus the rotor core 20 is effectively cooled.

On the X side, the coolant flowing into the communication flow paths 54*a*, 54*b*, 54*c* then flow into the discharging flow paths 60*a*, 60*b*, 60*c*, is discharged from the discharge ports 62*a*, 62*b*, 62*c* opening on the end surface 50*b* of the end plate 50, and then ejected to the coil end 8*a* due to centrifugal force generated by the rotation of the rotor 10. The coolant has not yet absorbed heat, and thus the coil end 8*a* is effectively cooled.

Further on the X side, the coolant which has cooled the rotor core 20 by passing through the flow paths 22*d*, 22*e*, 22*f* from the Y side reaches the end plate 50. The coolant having absorbed heat by flowing from the Y side is discharged through the discharging flow paths 70*a*, 70*b*, 70*c* from the discharge ports 72*a*, 72*b*, 72*c*. The coolant is ejected toward the coil end 8*a* by centrifugal force due to the rotation of the rotor 10. Although the coolant already cooled the rotor core 20 and thus absorbed heat, this coolant cools the coil end 8*a* along with the coolant ejected from the discharge ports 62*a*, 62*b*, 62*c*.

Since each of the branching parts to the discharging flow paths 60*a*, 60*b*, 60*c* is respectively configured such that the supply amount of the coolant flowing to its corresponding coolant flow path 22*a*, 22*b*, 22*c* is greater than the supply amount of the coolant flowing to its corresponding one of discharging flow paths 60*a*, 60*b*, 60*c*, the rotor core 20 is effectively cooled.

As shown in FIG. 1, also on the Y side of the rotor 10, the coolant flows from the flow path 14 of the shaft 12 into the supply paths 16*d*, 16*e*, 16*f* on the Y side. The coolant flows toward the X side in the flow paths 22*d*, 22*e*, 22*f* via the communication flow paths 54*d*, 54*e*, 54*f* of the end plate 52. The rotor core 20 is effectively cooled.

Similar to the X side, the coolant flows into the discharging flow paths 60*d*, 60*e*, 60*f* to be discharged from the discharge ports 62*d*, 62*e*, 62*f* opened on the end surface 52*b* of the end plate 52 on the Y side as well, and the coolant is ejected toward the coil end 8*b* due to the centrifugal force. The coil end 8*a* is effectively cooled.

Similar to the X side, the coolant which has cooled the rotor core 20 by passing through the flow paths 22*a*, 22*b*, 22*c* from the X side reaches the end plate 52. The coolant having absorbed heat by flowing from the X side is discharged through the discharging flow paths 70*d*, 70*e*, 70*f* from the discharge ports 72*d*, 72*e*, 72*f*, and is ejected toward the coil end 8*b* by centrifugal force. The coolant already having cooled the rotor core 20 and thus absorbed heat cools the coil end 8*b* along with the coolant discharged from the discharge ports 62*d*, 62*e*, 32*f*.

As described above, the rotor 10 disclosed herein comprises the flow paths 22*a*, 22*b*, 22*c* through which the coolant flows from the X side to the Y side of the rotor core 20 and the flow paths 22*d*, 22*e*, 22*f* through which the coolant flows from the Y side to the X side of the rotor core 20. Thus, the entire rotor core 20 can be effectively and uniformly cooled along the axial direction.

Since the rotor 10 is able to eject the coolant from the shaft 12 directly toward the coils ends 8*a*, 8*b* from the end plates 50, 52, the coil ends 8*a*, 8*b* can be uniformly cooled as well as effectively cooled. That is, because the flowing directions of the coolant in the rotor core 20 are opposed to each other in the axial direction and the coolant which is to be supplied to the rotor core 20 and thus has not yet absorbed heat is supplied to the coil ends 8*a*, 8*b* also both on the X and Y sides of the rotor core 20, the cooling capability for the coil ends 8*a*, 8*b* can be uniformized with a simple configuration. Further, the supply amount of the coolant to the discharging flow paths 70*a*, etc. can be easily increased or decreased by adjustment of an inner diameter of the discharging flow paths 70*a*, etc. Due to this, the cooling capability for the coil ends 8*a*, 8*b* can be adjusted depending on necessities. In particular, the cooling capability for the coil ends 8*a*, 8*b* can easily be enhanced.

The end plates 50, 52 have the same shape on the X and Y sides of the rotor core 20 and are offset from each other about the rotary axis Z by a predetermined angle, by which the rotor core 20 and the coil ends 8*a*, 8*b* can be easily cooled uniformly.

Although in the above embodiment the rotor 10 is mainly described, a motor comprising the rotor 10 as described above is also an aspect of the present teachings.

In the above embodiment, the communication flow paths 54*a*, etc. branch from their corresponding communication flow paths 54*a*, etc. into the discharging flow paths 60*a*, etc. in each of the end plates 50, 52, meaning that the coolant from the shaft 12 is obtained from a single common flow path (the communication flow path 54*a*, etc. in this case). Due to this, the supply paths 16*a*, etc. in the shaft 12 connect only with the communication flow paths 54*a*, etc., as a result of which the flowing configuration in the shaft 12 can be simplified. Alternatively, each of the communication flow paths 54*a*, etc. and the discharging flow paths 60*a*, etc. in the end plates 50, 52 may be configured to independently receive the coolant from a separate supply path defined in the shaft 12, respectively.

Although in the above embodiment the communication flow paths 54*a*, etc. are defined as grooves which communicate with the supply paths 16*a*, etc. and the flow paths 22*a*, etc. respectively so as to easily form the communication flow paths 54*a*, etc., this is not limiting. For example, the communication flow paths 54*a*, etc. may be holes extending through the end plates 50, 52. Similarly, the discharging flow paths 60*a* to 60*f*, 70*a* to 70*f* may not be holes extending through the end plates 50, 52, but may be grooves.

Although in the above embodiment the end plates 50, 52 sandwiching the rotor core 20 from the X and Y sides have the same shape to make it possible to cool the coil ends 8*a*, 8*b* uniformly with a simple configuration, this is not limiting. The flow paths in each of the end plates 50, 52 may be suitably reduced or increased and/or the configuration/layout of the flow paths in each of the end plates 50, 52 may be suitably modified according to how much the coil ends 8*a*, 8*b* should be cooled.

The present teachings include following items based on the above description.

[Item 1] A rotor, comprising: a shaft extending in an axial direction and through which coolant passes; a rotor core fixed to the shaft; a first end plate positioned on one side of the axial direction of the rotor core; and a second end plate positioned on another side of the axial direction of the rotor core, wherein the rotor core comprises a first flow path which allows the coolant to flow from the one side to the other side of the axial direction and a second flow path which allows the coolant to flow from the other side to the one side of the axial direction, the first end plate comprises a first communication flow path which allows the coolant to flow from the shaft to the first flow path and a first main discharging flow path which allows the coolant to flow from the shaft to outside, and the second end plate comprises a second communication flow path which allows the coolant to flow from the shaft to the second flow path and a second main discharging flow path which allows the coolant to flow from the shaft to outside.

[Item 2] The rotor according to item 1, wherein the first end plate comprises the first communication flow path and the first main discharging flow path such that both of the flow paths are branched from each other, and the second end plate comprises the second communication flow path and the second main discharging flow path such that both of the flow paths are branched from each other.

[Item 3] The rotor according to item 2, wherein the first communication flow path is configured to receive the coolant from the shaft and allow the coolant to flow to the first flow path and the first main discharging flow path is branched from the first communication flow path, and the second communication flow path is configured to receive the coolant from the shaft and allow the coolant to flow to the second flow path and the second main discharging flow path is branched from the second communication flow path.

[Item 4] The rotor according to any one of item 1 to 3, wherein the first communication flow path is configured such that a supply amount of the coolant to the first flow path is greater than the supply amount of the coolant to the first main discharging flow path, and the second communication flow path is configured such that the supply amount of the coolant to the second flow path is greater than the supply amount of the coolant to the second main discharging flow path.

[Item 5] The rotor according to any one of item 1 to 4, wherein the first main discharging flow path is configured to discharge the coolant from the shaft obliquely from the first end plate, toward an outer side in a radial direction of the rotor core and toward the one side of the axial direction, and the second main discharging flow path is configured to discharge the coolant from the shaft obliquely from the second end plate, toward the outer side in the radial direction of the rotor core and toward the other side of the axial direction.

[Item 6] The rotor according to any one of item 1 to 5, wherein the first end plate comprises a first auxiliary discharging flow path configured to discharge the coolant delivered through the second flow path, and the second end plate comprises a second auxiliary discharging flow path configured to discharge the coolant delivered through the first flow path.

[Item 7] The rotor according to any one of item 1 to 6, wherein the first flow path comprises a plurality of first flow paths, the second flow path comprises a plurality of second flow paths, and the rotor core comprises the plurality of first flow paths and the plurality of second flow paths alternately along a circumferential direction of the rotor core.

[Item 8] The rotor according to any one of item 1 to 7, wherein the first end plate and the second end plate have a same shape and are both fixed on the rotor core such that the first end plate and the second end plate are offset from each other by a predetermined angle about a rotary axis of the shaft.

[Item 9] A motor comprising: the rotor according to any one of item 1 to 8 and a stator.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A rotor, comprising:
a shaft extending in an axial direction and through which coolant passes;
a rotor core fixed to the shaft;
a first end plate positioned on one side of the axial direction of the rotor core; and
a second end plate positioned on another side of the axial direction of the rotor core,
wherein the rotor core comprises a first flow path which allows the coolant to flow from the one side to the other side of the axial direction and a second flow path which allows the coolant to flow from the other side to the one side of the axial direction,
the first end plate comprises a first communication flow path which allows the coolant to flow from the shaft to the first flow path and a first main discharging flow path which allows the coolant to flow from the shaft to outside, and the second end plate comprises a second communication flow path which allows the coolant to flow from the shaft to the second flow path and a second main discharging flow path which allows the coolant to flow from the shaft to outside, wherein the first main discharging flow path is configured to discharge the coolant in a radially outward direction from the shaft obliquely from the first end plate, toward an outer side in a radial direction of the rotor core and toward the one side of the axial direction, and the second main discharging flow path is configured to discharge the coolant in a radially outward direction from the shaft obliquely from the second end plate, toward the outer side in the radial direction of the rotor core and toward the other side of the axial direction.

2. The rotor according to claim 1, wherein the first end plate comprises the first communication flow path and the first main discharging flow path such that both of the flow paths are branched from each other, and the second end plate comprises the second communication flow path and the second main discharging flow path such that both of the flow paths are branched from each other.

3. The rotor according to claim 2, wherein the first communication flow path is configured to receive the coolant from the shaft and allow the coolant to flow to the first flow path and the first main discharging flow path is branched from the first communication flow path, and the second communication flow path is configured to receive the coolant from the shaft and allow the coolant to flow to the second flow path and the second main discharging flow path is branched from the second communication flow path.

4. The rotor according to claim 3, wherein the first communication flow path is configured such that a supply amount of the coolant to the first flow path is greater than the supply amount of the coolant to the first main discharging flow path, and the second communication flow path is configured such that the supply amount of the coolant to the second flow path is greater than the supply amount of the coolant to the second main discharging flow path.

5. The rotor according to claim 1, wherein the first end plate comprises a first auxiliary discharging flow path configured to discharge the coolant delivered through the second flow path, and the second end plate comprises a second auxiliary discharging flow path configured to discharge the coolant delivered through the first flow path.

6. The rotor according to claim 1, wherein the first flow path comprises a plurality of first flow paths, the second flow path comprises a plurality of second flow paths, and the rotor core comprises the plurality of first flow paths and the plurality of second flow paths alternately along a circumferential direction of the rotor core.

7. The rotor according to claim 1, wherein the first end plate and the second end plate have a same shape and are both fixed on the rotor core such that the first end plate and the second end plate are offset from each other by a predetermined angle about a rotary axis of the shaft.

* * * * *